United States Patent
Xu

(10) Patent No.: US 12,010,600 B2
(45) Date of Patent: Jun. 11, 2024

(54) METHOD, DEVICE, AND SERVER FOR EMERGENCY COMMUNICATION

(71) Applicant: Micron Electronics LLC, Boca Raton, FL (US)

(72) Inventor: Jun Xu, Boca Raton, FL (US)

(73) Assignee: Micron Electronics LLC, Boca Raton, FL (US)

(*) Notice: Subject to any disclaimer, the term of this patent is extended or adjusted under 35 U.S.C. 154(b) by 0 days.

(21) Appl. No.: 17/374,464

(22) Filed: Jul. 13, 2021

(65) Prior Publication Data

US 2022/0014894 A1 Jan. 13, 2022

Related U.S. Application Data

(60) Provisional application No. 63/051,034, filed on Jul. 13, 2020.

(51) Int. Cl.
| H04W 4/00 | (2018.01) |
| H04L 1/1867 | (2023.01) |
| H04M 3/523 | (2006.01) |
| H04W 4/029 | (2018.01) |
| H04W 4/90 | (2018.01) |

(52) U.S. Cl.
CPC .............. *H04W 4/90* (2018.02); *H04L 1/189* (2013.01); *H04M 3/5231* (2013.01); *H04W 4/029* (2018.02)

(58) Field of Classification Search
CPC ........ H04W 4/90; H04W 4/029; H04L 1/189; H04M 3/5231; H04M 3/5116
See application file for complete search history.

(56) References Cited

U.S. PATENT DOCUMENTS

| 8,483,655 | B2* | 7/2013 | Wijayanathan | H04W 76/50 455/445 |
| 9,924,043 | B2* | 3/2018 | Mehta | H04M 3/42357 |
| 2012/0115430 | A1* | 5/2012 | Hawkes | H04W 4/90 455/404.1 |
| 2014/0213213 | A1* | 7/2014 | Sieg | G08B 25/016 455/404.1 |
| 2017/0374538 | A1* | 12/2017 | Gellens | H04W 4/48 |
| 2019/0313230 | A1* | 10/2019 | MacGabann | G16H 40/67 |
| 2019/0325288 | A1* | 10/2019 | Oyenan | G06N 20/00 |
| 2019/0327597 | A1* | 10/2019 | Katz | H04W 4/90 |
| 2020/0059752 | A1* | 2/2020 | Marko | H04W 4/02 |
| 2021/0250747 | A1* | 8/2021 | Buechter | H04W 4/90 |
| 2022/0201547 | A1* | 6/2022 | Gupta | H04W 4/14 |
| 2022/0345878 | A1* | 10/2022 | Thotton Veettil | H04W 24/10 |

FOREIGN PATENT DOCUMENTS

| CN | 105264926 A | * | 1/2016 | H04L 65/4069 |
| WO | WO-2006104560 A1 | * | 10/2006 | H04M 1/72541 |

OTHER PUBLICATIONS

CN-105264926 (Year: 2016).*

* cited by examiner

*Primary Examiner* — Erika A Washington
(74) *Attorney, Agent, or Firm* — ANOVA LAW GROUP, PLLC

(57) ABSTRACT

A method for emergency communication includes receiving, by a wireless device, a user instruction or an automatically triggered event for reporting an emergency to an emergency monitoring server; and in response to the user instruction or the automatically triggered event, transmitting, by the wireless device, a data-only report to the emergency monitoring server.

16 Claims, 3 Drawing Sheets

METHOD, DEVICE, AND SERVER FOR EMERGENCY COMMUNICATION

CROSS-REFERENCE TO RELATED APPLICATION

This application claims the priority of U. S. Provisional Patent Application No. 63/051,034, filed on Jul. 13, 2020, the entire content of which is incorporated herein by reference.

FIELD OF THE INVENTION

The present invention generally relates to security monitoring systems and, more particularly, to a method, a device, and a server for emergency communication.

BACKGROUND

Traditional personal emergency response systems (PERS) or traditional mobile PERS (mPERS) often communicate wirelessly and provide separate channels for transmitting voice, text, and data (including but not limited to GNSS data) simultaneously. In the PERS and mPERS, the voice, the text, and the data are transmitted sequentially. While such design offers potential advantages of enabling simplified circuitry, a smaller device size, and a lower power consumption, failure of transmitting one of the voice, the text, and the data may jam a communication channel and prevent subsequent transmissions. For example, data transmission proceeded by the voice call cannot be initiated until a voice call is terminated. Under certain circumstances where wireless signals are weak and the voice call is prone to fail or dead-loop, no data can be transmitted, resulting in failures of reporting from a wireless device to an emergency monitoring server. The present disclosure provides a method of reporting from the wireless device to the emergency monitoring server that eliminates the jam or the dead-loop.

BRIEF SUMMARY OF THE DISCLOSURE

One aspect of the present disclosure provides a method for emergency communication. The method includes: receiving, by a wireless device, a user instruction or an automatically triggered event for reporting an emergency to an emergency monitoring server; and in response to the user instruction or the automatically triggered event, transmitting, by the wireless device, a data-only report to the emergency monitoring server.

Another aspect of the present disclosure provides a wireless device. The wireless device includes: a memory storing program instructions; and a processor configured to execute the program instructions to: receive a user instruction or an automatically triggered event for reporting an emergency to an emergency monitoring server; and in response to the user instruction or the automatically triggered event, transmitting a data-only report to the emergency monitoring server.

Another aspect of the present disclosure provides an emergency monitoring server. The emergency monitoring server includes: a memory storing program instructions; and a processor configured to execute the program instructions to: receive a data-only report from a wireless device for reporting an emergency, the data-only report including at least a request for call-back message; acknowledge the receipt of the request for call-back message to the wireless device; and initiate a call-back phone call to the wireless device.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 1:
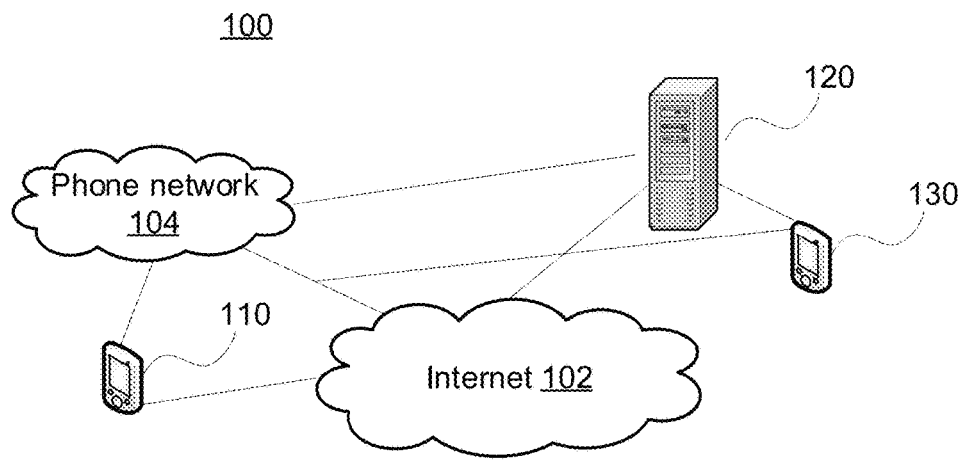
FIG. 1 illustrates an exemplary emergency communication environment incorporating certain aspects of the disclosed embodiments.

FIG. 1 illustrates an exemplary emergency communication environment incorporating certain aspects of the disclosed embodiments. As shown in FIG. 1, communication environment 100 may include the Internet 102, a phone network 104, a wireless device 110, an emergency monitoring server 120, and a communication device 130. Other components may be added and certain components may be removed without departing from the principles of the disclosed embodiments.

The Internet 102 may include any private and public computer networks interconnected using the standard transport control protocol/internet protocol (TCP/IP). Internet 102 may carry a large number of services over IP, such as the inter-linked hypertext documents of the World Wide Web (WWW) and electronic mail (or email). Internet 102 may connect a large number of websites. Further, Internet 102 may also carry voice-over IP (VOIP) services to enable voice or the like communications over Internet 102.

The phone network 104 may include any appropriate phone network such as a VOIP network, a public switched telephone network (PSTN), a cellular network, or any other telephone networks.

The wireless device 110 may include any appropriate communication device wirelessly communicate with the emergency monitoring server 120. For example, the wireless device 110 may include a phone, a smart phone, a computer, a cell/mobile phone, a PDA, a tablet, or any customized communication devices used under various emergency conditions, etc. Although one wireless device 110 is shown in FIG. 1, any number and types of wireless devices may be included.

The emergency monitoring server 120 may include one or more appropriate computer servers configured to provide various services to users through the Internet 102 and/or the phone network 104. For example, the emergency monitoring server 120 may provide monitoring services (e.g., emergency monitoring, security monitoring, other types of monitoring, etc.), emergency response services, and/or emergency information access services, etc. Although one emergency monitoring server 120 is included, any number of communication servers may be included.

The communication device 130 may include any appropriate device for communicating with the wireless device 110 directly through wireless channels. The communication device 130 may also communicate with the emergency monitoring server 120. Under certain circumstances, the communication device 130 and the emergency monitoring server 120 may be used interchangeably.

The wireless device 110 may communicate with the emergency monitoring server 120 wirelessly over various networks. For example, the wireless device 110 may use any available cellular wireless standards, such as, GSM, GPRS, CDMA, WCDMA, 3G, 4G, LTE, and 5G, etc., 2-way radio, point-to-point, satellite, WiFi, and any other appropriate wireless communication protocols to communicate with the emergency monitoring server 120.

Further, the wireless device 110 may communicate with the emergency monitoring server 120 through a wireless service operator or without a wireless service operator. For example, the wireless device 110 may communicate with the emergency monitoring server 120 using a wireless operator's short message service (SMS) to exchange information with the emergency monitoring server 120.

In a normal operation or a regular operation, the emergency monitoring server 120 may maintain a database to store various information about associated wireless devices. The wireless device 110 may periodically report a device status, such as a battery status of the wireless device 110, to the emergency monitoring server 120 according to pre-configured criteria. Further, the emergency monitoring server 120 may configure the wireless device 110 remotely.

For example, the emergency monitoring server 120 may set a status reporting period, or may set an emergency monitoring server (e.g., a phone number, an IP address, a SIP number, an IMS URI, etc.) or an intended reporting entity for the wireless device 110 to communicate with. When an emergency event or another intended condition happens, the wireless device 110 may communicate with the emergency monitoring server or the intended reporting entity automatically. The emergency monitoring server may include the emergency monitoring server 120 or a different entity, e.g., a 911 call center, etc. The intended reporting entity may include any appropriate devices or systems, such as a monitoring center, or a single user device (e.g., the communication device 130).

The communication environment 100 may be applied at various wireless communication systems and applications. For example, the communication environment 100 may include emergency wireless communication, asset tracking and monitoring, logistic, fleet management, and remote control, etc.

Figure 2:
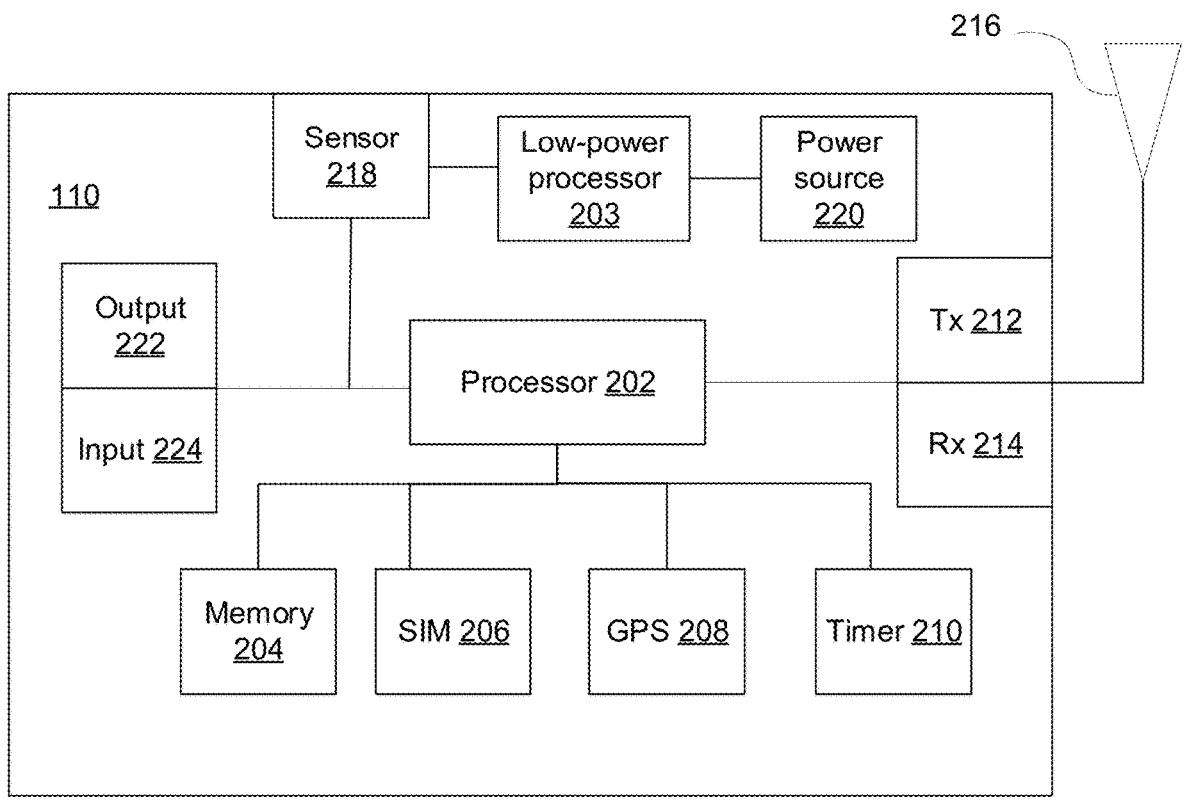
FIG. 2 illustrates a block diagram of an exemplary wireless device consistent with the disclosed embodiments.

FIG. 2 illustrates a block diagram of an exemplary wireless device 110 consistent with the disclosed embodiments. As shown in FIG. 2, the wireless device 110 may include a processor 202, a low-power processor 203, a memory 204, a subscriber identification module (SIM) 206, a global positioning system (GPS) unit 208, a timer 210, a transmitter 212, a receiver 214, an antenna 216, a sensor 218, a power source 220, an output 222, and an input 224. Certain components may be omitted, and other components may be added.

The processor 202 may include any appropriate type of graphic processing unit (GPU), general-purpose microprocessor, digital signal processor (DSP) or microcontroller, and application specific integrated circuit (ASIC), etc. The processor 202 may also include a communication processor, such as a base-band processor for wireless communication, etc.

The processor 202 may execute sequences of computer program instructions to perform various processes associated with the wireless device 110. The computer program instructions may be stored and/or loaded in the memory 204 for execution by the processor 202.

The low-power processor 203 may include its own memory and interfaces to connect to the sensor 218. The low-power processor 203 may monitor a sensing signal from the sensor 218 and determine whether the sensing signal triggers a wake-up event. In response to the wake-up event, the low-power processor 203 may connect the power source 220 to a first circuit of the wireless device 110. The first circuit may include at least the processor 202 and the memory 204 to perform the normal operation of the wireless device 110. The first circuit may further include other components of the wireless device 110 that are required for performing the normal operation of the wireless device 110. In certain embodiments, the first circuit may also include one or more of the SIM 206, the GPS 208, the timer 210, the transmitter 212, the receiver 214, the antenna 216, the output 222, and the input 224. In certain embodiments, the processor 202 may have the lower-power processor 203 built in.

In certain embodiments, the low-power processor 203 may further include one or more of its own sensor, timer, and low-power machine-to-machine (M2M) communication mechanism for detecting the wake-up event. The circuit for detecting the wake-up event and connecting the power source to the first circuit after the wake-up event is detected is called a second circuit. The second circuit may include at least the low-power processor 203. The second circuit does not perform the normal operation of the wireless device 110. The second circuit manages connection of the power source 220 to the first circuit. The second circuit is always connected to the power source 220, but consumes substantially less power than the first circuit.

The memory 204 may include any appropriate memory units, such as random-access memory (RAM), read-only memory (ROM), flash memory, or any other type of memory or storage. The memory 204 may include a non-volatile memory (e.g., flash memory) for storing data as well as program execution states to preserve such information when power is not available. The non-volatile and other volatile memory may also be used for executing computer programs and storing run-time data, etc.

The SIM 206 may include any appropriate subscriber identification card to authenticate the wireless device 110 and for accessing a wireless network corresponding to the SIM 206. Although the SIM 206 is used in FIG. 2, any type of identification device may be used.

The GPS 208 may include any appropriate GPS device for providing location information about the wireless device 110. The timer 210 may provide various timer functions and associated logics for the wireless device 110.

Further, through the antenna 216, the transmitter 212 and the receiver 214 may provide wireless data communication transmission and receiving functions according to various wireless communication protocols. The sensor 218 may include any appropriate type of sensors for sensing one or more parameters such that a sensing signal may be provided to the processor 202 for further processing to determine the sensing parameters, or the sensing signal may be used directly to control certain logics of the wireless device 110.

The power source 220 may include any appropriate power source to provide an electrical power to the first circuit and the second circuit, such as the processor 202, the low-power processor 203, and other components of the wireless device 110. For example, the power source 220 may include AC power, DC power, solar power, and/or other power. In certain embodiments, the power source 220 may include one or more batteries, and the one or more batteries may be recharged using various types of external power sources. Further, the power source 220 may also include certain control logics for sending battery status to report to the processor 202 and/or to controlling/distributing battery output to the various components. A power-on switch (not shown) may be used to control the power to the various components of the wireless device 110, such as the processor 202, the SIM 206, the transmitter 212, and the receiver 214, etc.

The output 222 may be provided for a user of the wireless device 110 to receive information from the wireless device 110. For example, the output 222 may include any appropriate output device, such as a display, a speaker, or any other output devices.

The input 224 may be provided for the user of the wireless device 110 to input information into the wireless device 110. For example, the input 224 may include any appropriate input device, such as a keyboard, a microphone, a touch screen, or any other input devices. In certain embodiments, the input 224 may be a single button, which can be pressed by the user such that a communication message can be sent to a pre-configured emergency monitoring server or a pre-configured intended reporting entity.

Figure 3:
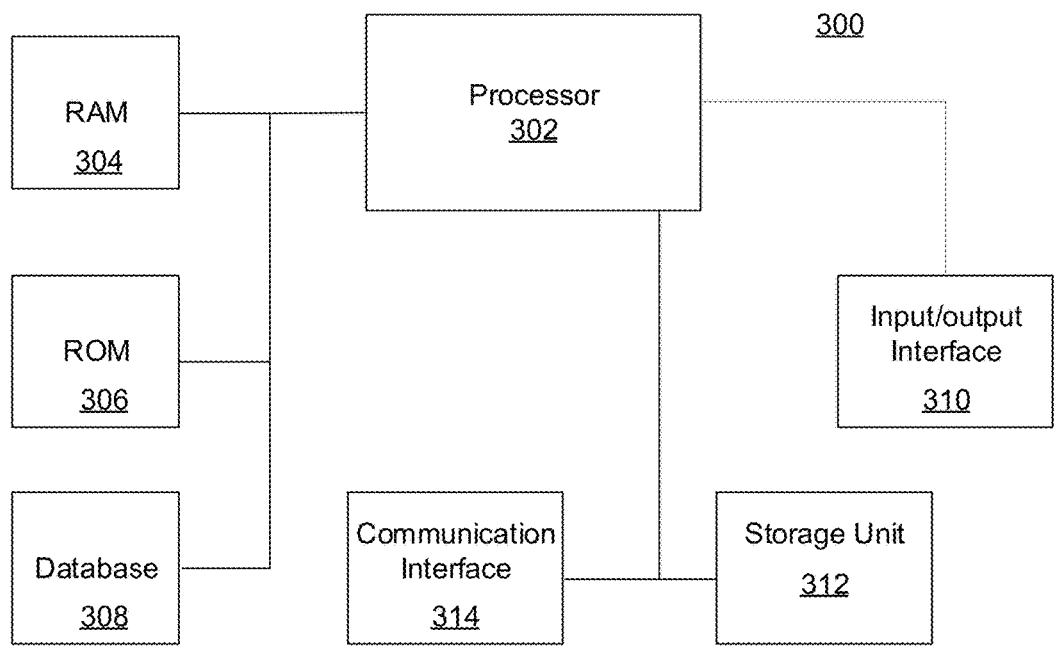
FIG. 3 illustrates a block diagram of an exemplary emergency monitoring server consistent with the disclosed embodiments.

On the other hand, the emergency monitoring server 120 may be implemented by any appropriate computer system. FIG. 3 illustrates a block diagram of an exemplary computing system 300 used to implement emergency monitoring server 120.

As shown in FIG. 3, the computing system 300 may include a processor 302, a random-access memory (RAM) unit 304, a read-only memory (ROM) unit 306, a database 308, an input/output interface unit 310, a storage unit 312, and a communication interface 314. Other components may be added and certain devices may be removed without departing from the principles of the disclosed embodiments.

The processor 302 may include any appropriate type of graphic processing unit (GPU), general-purpose microprocessor, digital signal processor (DSP) or microcontroller, and application specific integrated circuit (ASIC), etc. The processor 302 may execute sequences of computer program instructions to perform various processes associated with the computing system 300. The computer program instructions may be loaded into the RAM 304 for execution by the processor 302 from the ROM 306.

The database 308 may include any appropriate commercial or customized database to be used by the computing system 300, and may also include query tools and other management software for managing the database 308. Further, the input/output interface 310 may be provided for a user or users to input information into the computing system 300 or for the user or users to receive information from the computing system 300. For example, the input/output interface 310 may include any appropriate input device, such as a remote control, a keyboard, a mouse, a microphone, a video camera or web-cam, an electronic tablet, voice communication devices, or any other optical or wireless input devices. The input/output interface 310 may also include any appropriate output device, such as a display, a speaker, or any other output devices.

The storage unit 312 may include any appropriate storage device to store information used by the computing system 300, such as a hard disk, a flash disk, an optical disk, a CR-ROM drive, a DVD or other type of mass storage media, or a network storage. Further, the communication interface 314 may provide communication connections such that the computing system 300 may be accessed remotely and/or communicate with other systems through computer networks or other communication networks via various communication protocols, such as TCP/IP, hyper text transfer protocol (HTTP), etc.

Returning to FIG. 1, during the normal operation, the wireless device 110 and the emergency monitoring server 120 may perform certain operations to provide communication services with an enhanced emergency reporting capability. That is, as disclosed, the wireless device 110 and the emergency monitoring server 120 may be configured to implement a method for emergency communication with a substantially reduced abandonment rate of phone calls between the wireless device 110 and the emergency monitoring server 120.

For example, in certain embodiments, the wireless device 110 may be configured to support a data-first or a data-only operation mode that reduces a rate of failed communication. In the data-first or the data-only operation mode, the wireless device 110 only transmits a data-only report to the emergency monitoring server 120 when the wireless device 110 is instructed by a user or automatically triggered by an emergency event. The wireless device 110 repeats the transmission of the data-only report to the emergency monitoring server 120 until the emergency monitoring server 120 acknowledges the receipt of the data-only report sent from the wireless device 110.

In the existing emergency communication method, when the wireless signals are weak, voice phone calls are prone to fail or "dead-loop". Due to the sequential nature of the existing emergency communication method, voice phone call failure jams the emergency communication data and prevents any data from being sent from the wireless device 110 to the emergency monitoring server 120, resulting in failed reporting. The data-only or the data-first operation mode eliminates the jamming problem.

Figure 4:
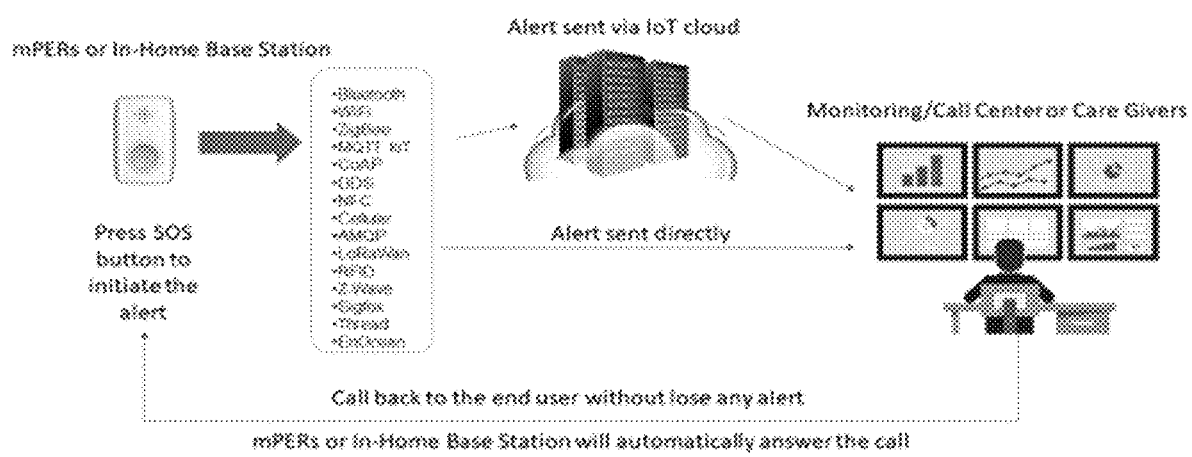
FIG. 4 illustrates an exemplary emergency communication system consistent with the disclosed embodiments.

FIG. 4 illustrates an exemplary emergency communication system consistent with the disclosed embodiments. In some embodiments, as shown in FIG. 4, the emergency communication system is a mobile personal emergency response system (mPERS) or an in-home personal emergency response system (PERS). The emergency communication system includes an mPERS wireless device or a PERS in-home base station, and a monitoring center. The mPERS device is similar to the wireless device 110 in FIG. 1. The mPERS device communicates with the monitoring center through cellular network such as 4G and 5G wireless networks. The PERS in-home base station is connected to at least one of the phone network 104 or the internet 102 shown in FIG. 1. The PERS in-home base station is connected to a plurality of smart devices monitoring emergency events. The PERS in-home base station communicates with the plurality of smart devices through a communication protocol such as Bluetooth, WiFi, ZigBee, MQTT IoT, CoAP, DDS, NFC, AMQP, LoRaWan, RFID, Z-Wave, Sigfox, Thread, or EnOcean.

The monitoring center may include one or more monitoring servers and a plurality of call center operators or emergency care givers. A user of the mPERS or the PERS in-home base station subscribes to an emergency service, such as a medical emergency service. In case of emergency, the user may press an SOS button of a smart device to initiate reporting an emergency event. The smart device communicates with the mPERS or the PERS in-home base station which reports the emergency event to the monitoring center. Generally, a voice phone call is established between the user and an emergency care giver.

In some embodiments, an emergency monitoring service is provided to the user at home through the PERS in-home base station. mPERS allows the user to leave home and continue to have access to the emergency monitoring service. As shown in FIG. 4, an emergency alert may be sent to the monitoring center directly or indirectly through an Internet of Things (IoT) cloud. The emergency care giver at the monitoring center may initiate a call-back phone call to the user after receiving an emergency report from the user.

Figure 5:
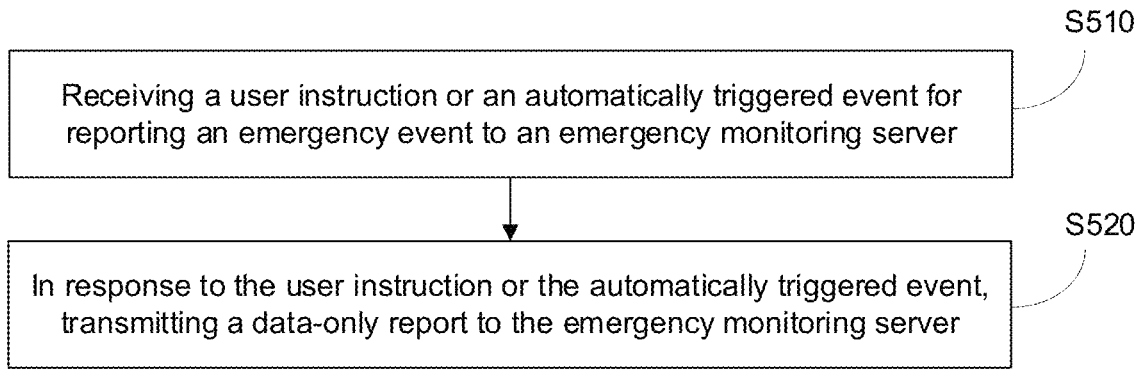
FIG. 5 illustrates a flowchart of an exemplary method for emergency communication for a wireless device consistent with the disclosed embodiments.

FIG. 5 illustrates a flowchart of an exemplary method for emergency communication for a wireless device consistent with the disclosed embodiments. As shown in FIG. 5, the method for emergency communication for the wireless device includes the following processes.

At S510, a user instruction or an automatically triggered event for reporting an emergency event to an emergency monitoring server is received.

In some embodiments, the user presses an emergency reporting button on the wireless device to initiate reporting the emergency event to the emergency monitoring server. In some other embodiments, the emergency event is automatically detected by the wireless device or a smart device associated with the wireless device and the wireless device is triggered to initiate reporting the emergency event to the emergency monitoring server.

At S520, in response to the user instruction or the automatically triggered event, the wireless device transmits a data-only report to the emergency monitoring server.

In some embodiments, after the wireless device receives the user input or the automatically triggered event, the wireless device transmits the data-only report to the emergency server. The data-only report includes a request for call-back message to request the emergency monitoring server to initiate a call-back phone call to the wireless device. After the emergency monitoring server receives the data-only report including the request for call-back message, the emergency monitoring server acknowledges the receipt of the request for call-back message to the wireless device and initiates the call-back phone call to the wireless device.

In some embodiments, the wireless signals may be weak for the wireless device. To make sure the data-only report reaches the emergency monitoring server, the wireless device repeatedly transmits the data-only report to the emergency monitoring server until the wireless device receives a message from the emergency monitoring server acknowledging the receipt of the request for call-back message. After the emergency monitoring server initiates the call-back phone call to the wireless device, the wireless device automatically answers the call-back phone call from the emergency monitoring server. In this case, the emergency care giver and the user of the wireless device may talk to each other without the user answering the call-back phone call. This is extremely important when the user is unable to move, but is able to speak.

The wireless device may communicate with the emergency monitoring server directly or through a cloud server. In some embodiments, the wireless device communicates with the emergency monitoring server directly over a dedicated wireless communication network. In some other embodiments, the wireless device communicates with the emergency monitoring server indirectly through a public wireless network. In this case, the wireless device may transmit the data-only report to an intermediate cloud server, which in turn relays the data-only report to the emergency monitoring server.

In some embodiments, the wireless device may communicate with the emergency monitoring server using a VoLTE or a 5G wireless communication protocol. For example, the call-back phone call may be established between the wireless device and the emergency monitoring server using the VoLTE rather than a voice communication network or a public switched telephone network (PSTN).

In some embodiments, the data-only report further includes location information of the wireless device. In this case, as long as the data-only report reaches the emergency monitoring server, the emergency monitoring server is able to locate the wireless device based on the location information included in the data-only report. When the wireless signals are weak and the call-back phone call is unable to be established, based on the location information of the wireless device, the emergency care giver at the emergency monitoring center may still be able to dispatch emergency personnel to the user of the wireless device (i.e., the subscriber of the emergency service) to provide emergency assistance.

In some embodiments, the location information of the wireless device may include global navigation satellite system (GNSS) data. For example, the location information of the wireless device may include global positioning system (GPS) data.

In the embodiments of the present disclosure, the emergency communication method for the wireless device repeatedly transmits the data-only report for reporting the emergency event to the emergency monitoring server until the emergency monitoring server acknowledges the receipt of the request for call-back message included in the data-only report. Compared with the existing emergency communication method, the present disclosure provides an improved performance for reporting the emergency event to the emergency monitoring server even under the circumstance of weak wireless signals.

Figure 6:
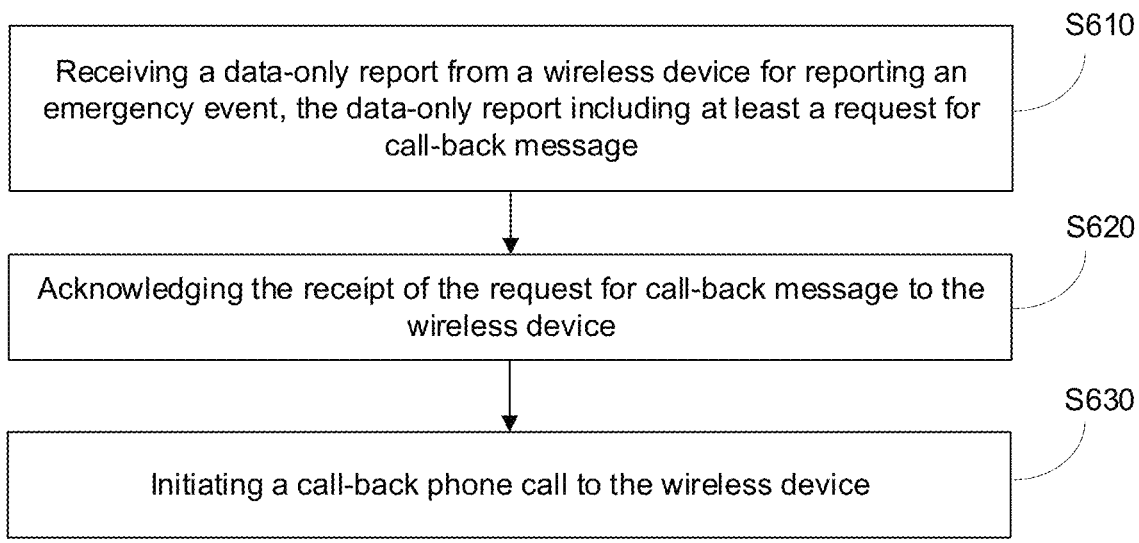
FIG. 6 illustrates a flowchart of an exemplary method for emergency communication for an emergency monitoring server consistent with the disclosed embodiments.

FIG. 6 illustrates a flowchart of an exemplary method for emergency communication for an emergency monitoring server consistent with the disclosed embodiments. As shown in FIG. 6, the method for emergency communication for the emergency monitoring server includes the following processes.

At S610, a data-only report is received from a wireless device for reporting an emergency event. The data-only report includes at least a request for call-back message.

In some embodiments, after the wireless device transmits the data-only report for reporting the emergency event to the emergency monitoring server, the emergency monitoring server receives the data-only report. The data-only report includes at least the request for call-back message.

At S620, the emergency monitoring server acknowledges the receipt of the request for call-back message to the wireless device.

In some embodiments, after receiving from the wireless device the data-only report including the request for call-back message, the emergency monitoring server sends a message to the wireless device to acknowledge the receipt of the request for call-back message. After receiving the message acknowledging the receipt of the request for call-back message, the wireless device stops transmitting the same data-only report to the emergency monitoring server.

At S630, the emergency monitoring server initiates a call-back phone call to the wireless device.

In some embodiments, after acknowledging the receipt of the request for call-back message, an emergency care giver controls the emergency monitoring server to initiate a call-back phone call to the wireless device in attempt to provide emergency assistance to the user of the wireless device.

In some embodiments, the data-only report further includes location information of the wireless device. In this case, as long as the data-only report reaches the emergency monitoring server, the emergency monitoring server is able to locate the wireless device based on the location information included in the data-only report. When the wireless signals are weak and the call-back phone call is unable to be established, based on the location information of the wireless device, the emergency care giver at the emergency monitoring center may still be able to dispatch emergency personnel to the user of the wireless device (i.e., the subscriber of the emergency service) to provide emergency assistance.

In some embodiments, the location information of the wireless device may include global navigation satellite system (GNSS) data. For example, the location information of the wireless device may include global positioning system (GPS) data.

In some embodiments, when the wireless signal of the wireless device is too weak, the call-back phone call initiated by the emergency care giver may never be established. In this case, the emergency care giver may decide to dispatch emergency personnel to the user of the wireless device based on the location information of the wireless device.

In the embodiments of the present disclosure, the emergency communication method for the wireless device repeatedly transmits the data-only report for reporting the emergency event to the emergency monitoring server until the emergency monitoring server acknowledges the receipt of the request for call-back message included in the data-only report. Transmitting the data-only report is more likely to be successful than making an emergency phone call by the wireless device. Compared with the existing emergency communication method, the present disclosure provides an improved performance for reporting the emergency event to the emergency monitoring server even under the circumstance of weak wireless signals. Thus, an abandonment rate of the emergency monitoring service is reduced.

The present disclosure also provides a wireless device for emergency communication. The wireless device includes a memory storing program instructions and a processor configured to execute the program instructions to receive a user instruction or an automatically triggered event for reporting an emergency event to an emergency monitoring server; and in response to the user instruction or the automatically triggered event, transmitting a data-only report to the emergency monitoring server.

In some embodiments, the data-only report includes at least a request for call-back message.

In some embodiments, the processor is further configured to execute the program instructions to repeatedly transmit the data-only report to the emergency monitoring server until the emergency monitoring server acknowledges a receipt of the request for call-back message to the wireless device.

In some embodiments, the processor is further configured to execute the program instructions to automatically answer a call-back initiated by the emergency monitoring server in response to receiving the data-only report including at least the request for call-back message from the wireless device.

In some embodiments, the processor is further configured to execute the program instructions to transmit the data-only report to the emergency monitoring server directly or indirectly through a cloud server.

In some embodiments, the processor is further configured to execute the program instructions to transmit the data-only report to the emergency monitoring server using a VoLTE or a 5G wireless communication protocol.

In some embodiments, the data-only report further includes location information of the wireless device.

In some embodiments, the location information of the wireless device includes global navigation satellite system (GNSS) data.

In the embodiments of the present disclosure, the wireless device repeatedly transmits the data-only report for reporting the emergency event to the emergency monitoring server until the emergency monitoring server acknowledges the receipt of the request for call-back message included in the data-only report. Transmitting the data-only report is more likely to be successful than making an emergency phone call by the wireless device. Compared with the existing emergency communication method, the present disclosure provides an improved performance for reporting the emergency event to the emergency monitoring server even under the circumstance of weak wireless signals. Thus, the abandonment rate of the emergency monitoring service is reduced.

The present disclosure also provides an emergency monitoring server for emergency communication. The emergency monitoring server includes a memory storing program instructions and a processor configured to execute the program instructions receive a data-only report from a wireless device for reporting an emergency event, the data-only report including at least a request for call-back message; acknowledge the receipt of the request for call-back message to the wireless device; and initiate a call-back phone call to the wireless device.

In some embodiments, the processor is further configured to execute the program instructions to communicate with the wireless device using a VoLTE or a 5G wireless communication protocol.

In some embodiments, the data-only report further includes location information of the wireless device.

In some embodiments, the processor is further configured to execute the program instructions to locate the wireless device based on the location information of the wireless device.

In the embodiments of the present disclosure, the wireless device repeatedly transmits the data-only report for reporting the emergency event to the emergency monitoring server until the emergency monitoring server acknowledges the receipt of the request for call-back message included in the data-only report. Transmitting the data-only report is more likely to be successful than making an emergency phone call by the wireless device. In addition, the call-back phone call initiated by the emergency monitoring server has a higher success rate than the emergency phone call initiated by the wireless device. Compared with the existing emergency communication method, the present disclosure provides an improved performance for reporting the emergency event to the emergency monitoring server even under the circumstance of weak wireless signals. Thus, the abandonment rate of the emergency monitoring service is reduced.

Those skilled in the art should understand that all or some of the processes in above-described the embodiments of the present disclosure may be implemented by instructing relevant hardware through a computer program. The computer program may be stored in a computer-readable storage medium. When being executed, the computer program includes the processes of the above-described method embodiments. The storage medium may be a magnetic disk, an optical disk, a read-only memory (ROM), or a random-access memory (RAM), etc.

In the specification, specific examples are used to explain the principles and implementations of the present disclosure. The description of the embodiments is intended to assist comprehension of the methods and core inventive ideas of the present disclosure. At the same time, those of ordinary skill in the art may change or modify the specific implementation and the scope of the application according to the embodiments of the present disclosure. Thus, the content of the specification should not be construed as limiting the present disclosure.

What is claimed is:

1. A method for emergency communication, comprising:
   receiving, by a wireless device, a user instruction for reporting an emergency event to an emergency monitoring server, wherein the wireless device is connected to a phone network and the Internet, and the emergency monitoring server is also connected to the phone network and the Internet, wherein the user instruction is received by the wireless device through a press on an SOS button of the wireless device;
   determining data transmission is more reliable than voice call under a network condition where data transmission channel and voice transmission channel are sequentially arranged;
   in response to the user instruction and in response to a determination of the network condition, transmitting, by the wireless device, a data-only report to the emergency monitoring server in a data-only operation mode without making any voice phone call;
   reporting, by the wireless device, a device status of the wireless device to the emergency monitoring server; and
   receiving, by the wireless device, remote configuration from the emergency monitoring server.

2. The method according to claim 1, wherein:
   the data-only report includes at least a request for call-back message.

3. The method according to claim 2, wherein transmitting, by the wireless device, the data-only report to the emergency monitoring server includes:
   repeatedly transmitting, by the wireless device, the data-only report to the emergency monitoring server until the emergency monitoring server acknowledges a receipt of the request for call-back message to the wireless device.

4. The method according to claim 3, further comprising:
   automatically answering, by the wireless device, a call-back initiated by the emergency monitoring server.

5. The method according to claim 1, wherein:
   the data-only report includes location information of the wireless device.

6. The method according to claim 1, wherein the emergency monitoring server maintains a database to store information about associated wireless devices, the associated wireless devices include the wireless device receiving the user instruction.

7. The method according to claim 1, wherein the device status includes a battery status of the wireless device.

8. The method according to claim 1, further comprising:
   receiving, by the wireless device, an acknowledgement message from the emergency monitoring server, the acknowledgement message acknowledging the receipt of the request for call-back message.

9. The method according to claim 8, further comprising:
   after the receipt by the wireless device of the acknowledgement message from the emergency monitoring server, receiving, by the wireless device, a call-back phone call from the emergency monitoring server.

10. The method according to claim 8, further comprising:
    after the receipt by the wireless device of the acknowledgement message from the emergency monitoring server, failing to receive, by the wireless device, a call-back phone call sent by or sent from the emergency monitoring server.

11. The method according to claim 10, further comprising:
    in response to failing to receive the call-back phone call from the emergency monitoring server, receiving, by the wireless device, emergency assistance dispatched by an emergency monitoring center instructed by the emergency monitoring server.

12. A wireless device comprising: a memory storing program instructions; and a processor configured to execute the program instructions to:
    receive a user instruction for reporting an emergency event to an emergency monitoring server, wherein the wireless device is connected to a phone network and the Internet, and the emergency monitoring server is also connected to the phone network and the Internet, wherein the user instruction is received by the wireless device through a press on an SOS button of the wireless device;
    determining data transmission is more reliable than voice call under a network condition where data transmission channel and voice transmission channel are sequentially arranged;
    in response to the user instruction and in response to a determination of the network condition, transmitting a data-only report to the emergency monitoring server in a data-only operation mode without making any voice phone call;
    reporting a device status of the wireless device to the emergency monitoring server; and
    receiving remote configuration from the emergency monitoring server.

13. The wireless device according to claim 12, wherein:
    the data-only report includes at least a request for call-back message.

14. The wireless device according, to claim 13, wherein the processor is further configured to;
    repeatedly transmit the data-only report to the emergency monitoring server until the emergency monitoring server acknowledges a receipt of the request for call-back message to the wireless device.

15. The wireless device according to claim 14, wherein the processor is further configured to:
    automatically answer a call-back initiated by the emergency monitoring server in response to receiving the data-only report including at least the request for call-back message from the wireless device.

16. The wireless device according to claim 12, wherein:
    the data-only report includes location information of the wireless device.

* * * * *